United States Patent [19]

Yumikura et al.

[11] Patent Number: 4,651,819

[45] Date of Patent: Mar. 24, 1987

[54] MASS TRANSFER HEAT EXCHANGER

[75] Inventors: Tsuneo Yumikura; Masaki Ikeuchi; Kazushige Nakao; Eiichi Ozaki, all of Hyogo, Japan

[73] Assignee: Mitsubishi Denki Kabushiki Kaisha, Tokyo, Japan

[21] Appl. No.: 669,924

[22] Filed: Nov. 9, 1984

[30] Foreign Application Priority Data

Nov. 9, 1983 [JP] Japan .................................. 58-211936

[51] Int. Cl.⁴ .......................... F28D 3/02; F25B 37/00
[52] U.S. Cl. ...................................... 165/115; 62/484; 62/494; 261/153; 261/156; 261/140.2
[58] Field of Search .................. 165/115, 118; 62/484, 62/494; 261/140 R, 140 A, 112, 156, 153

[56] References Cited

U.S. PATENT DOCUMENTS

| 2,267,568 | 12/1941 | Kleucker . | |
|---|---|---|---|
| 2,502,104 | 3/1950 | Reid, Jr. | 62/494 |
| 3,271,969 | 9/1966 | Lorentzen | 261/153 |
| 4,424,688 | 1/1984 | Wilkinson . | |
| 4,477,396 | 10/1984 | Wilkinson | 62/494 |

FOREIGN PATENT DOCUMENTS

| 558574 | 8/1932 | Fed. Rep. of Germany . |
| 896655 | 11/1953 | Fed. Rep. of Germany . |
| 3219424 | 2/1983 | Fed. Rep. of Germany . |
| 627185 | 8/1949 | United Kingdom . |
| 909021 | 10/1962 | United Kingdom . |

Primary Examiner—Albert W. Davis, Jr.
Attorney, Agent, or Firm—Sughrue, Mion, Zinn, Macpeak and Seas

[57] ABSTRACT

An improved mass transfer heat exchanger in which heat transmission surfaces are more effectively used and having excellent mass transmission characteristics. Heat transmission pipes are arranged vertically in a tank, extending through a partition board dividing the tank into upper and lower chambers. A solution lead-in pipe supplies a high-density solution to be subjected to heat exchange to the upper chamber, and a pump draws a low-density solution obtained by mass exchange out of the lower chamber and delivers a part thereof to the upper chamber. The upper and lower chambers are communicated through a return pipe which delivers to the lower chamber an intermediate-density solution obtained by mixing the high-density solution and a surplus of the low-density solution in the upper chamber. A vapor lead-in pipe supplies vapor to the lower chamber. The intermediate-density solution flows down the heat transmission pipes, passing through gaps between the partition boards and heat transmission pipes.

2 Claims, 10 Drawing Figures

MASS TRANSFER HEAT EXCHANGER

BACKGROUND OF THE INVENTION

The present invention relates to a mass transfer heat exchanger in which a solution for mass exchange is allowed to flow along the outer walls of heat transmission pipes where it absorbs steam to generate heat, and the heat thus generated is transmitted to a fluid which flows in the heat transmission pipes.

An example of a conventional device of this type is shown in FIG. 1. In FIG. 1, reference numeral 1 designates a tank; 2, heat transmission pipes arranged horizontally in the tank 1; 3, a sprinkling trough for pooling high-density solution 10 used for mass exchange; 4, sprinkling outlets connected to the bottom of the trough 3; 5, a low-density solution lead-out pipe for conveying low-density solution 11 obtained by mass exchange out of the tank 1; 6, a high-density solution lead-in pipe for supplying high-density solution to the sprinkling trough 3; 7, a vapor lead-in pipe for supplying steam 12 into the tank 1; 8, a pump; and 9, a low-density solution discharge pipe.

The device thus constructed operates as follows: A high-density solution 10 is supplied through the high-density lead-in pipe 6 connected to the tank 1 and pooled in the sprinkling trough 3. The solution 10 thus pooled is sprinkled over the heat transmission pipes 2 through the sprinkling outlets 4 at the bottom of the trough 3. While flowing down the outer walls of the heat transmission pipes 2, the high-density solution 10 absorbs vapor 12 supplied through the vapor lead-in pipe 7. As a result, it is changed into a low-density solution while generating heat. The heat thus generated is transmitted to the fluid in the heat transmission pipes 2 through the walls thereof. On the other hand, the solution 11 which has absorbed the vapor 12 is discharged out of the device through the low-density solution lead-out pipe 5 and the low-density solution discharge pipe 9 by the pump 8.

With the conventional mass transfer heat exchanger constructed as described above, if the heat transmission pipes 2 arranged horizontally are long in the axial direction, it is rather difficult to uniformly wet the outer walls of the heat transmission pipes 2 with the high-density solution 10 sprinkled through the sprinkling outlets 4. This tendency is significant especially for the lower heat transmission pipes. In the case where the heat transmission pipes are disposed horizontally, it is necessary to provide a number of sprinkling outlets 4 for the sprinkling trough 3, and accordingly it is difficult to uniformly distribute the high-density solution 10 Further, in the case where the tank 1 is tilted, the high-density solution 10 is not uniformly sprinkled over the outer walls of the heat transmission pipes 2, as is apparent from FIG. 2. Sometimes, the heat exchanger suffers from a difficulty that the amount of high-density solution 10 supplied through the high-density solution lead-in pipe 6 is more than the amount of high-density solution sprinkled through the sprinkling outlets 4, that is, sprinkling the high-density solution is not continuous.

It is clear from the above description that, the conventional mass transfer heat exchanger is disadvantageous in that the heat transmission surfaces are not effectively utilized, and the mass transmission characteristic is poor.

SUMMARY OF THE INVENTION

Accordingly, an object of the invention is to eliminate the above-described difficulties accompanying a conventional mass transfer heat exchanger.

In accordance with the above and other objects, the invention provides a mass transfer heat changer having an excellent mass transmission characteristic, which comprises a tank in which heat transmission pipes are arranged vertically; a partition board through which the heat transmission pipes extend, the partition board dividing the tank into the upper and lower chambers; a high-density solution lead-in pipe for supplying a high-density solution to be subjected to mass exchange into the upper chamber; a pump for drawing a low-density solution obtained by mass exchange out of the lower chamber and for delivering a part of the low-density solution into the upper chamber; a return pipe through which the upper chamber is communicated with the lower chamber, the return pipe being used to deliver to the lower chamber an intermediate-density solution which is obtained by mixing the high-density solution and a surplus of low-density solution in the upper chamber; and a vapor lead-in pipe for supplying vapor into the lower chamber so that the intermediate-density solution flows down the heat transmission pipes passing through the gaps between the partition boards and the heat transmission pipes and absorbs the vapor while flowing down to generate heat, and the heat thus generated is transmitted to the fluid which flows through the heat transmission pipes.

DESCRIPTION OF THE PREFERRED EMBODIMENTS

The invention will now be described with reference to preferred embodiments shown in the accompanying drawings.

Figure 1:
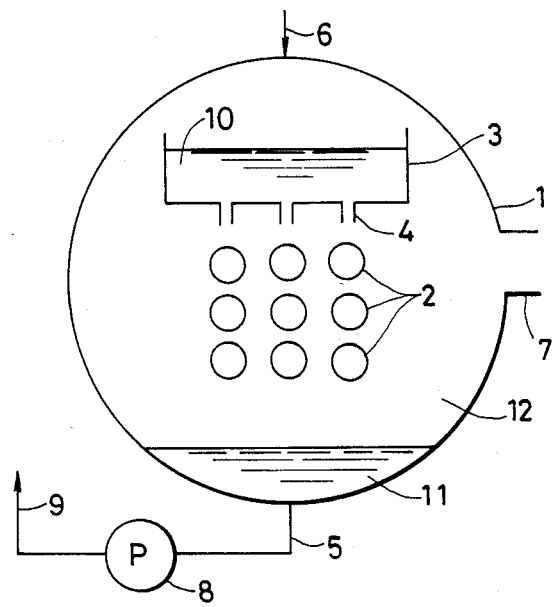
FIG. 1 is an explanatory diagram showing the arrangement of an example of a conventional mass transfer heat exchanger.
Figure 2:
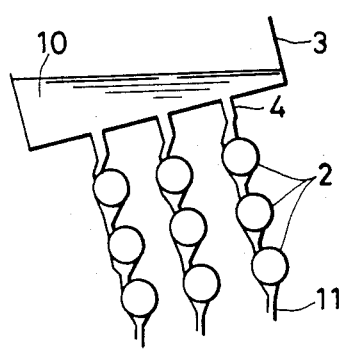
FIG. 2 is an explanatory diagram showing the solution flowing down heat transmission pipes in the case where the tank of the heat exchanger in FIG. 1 is tilted.
Figure 3:
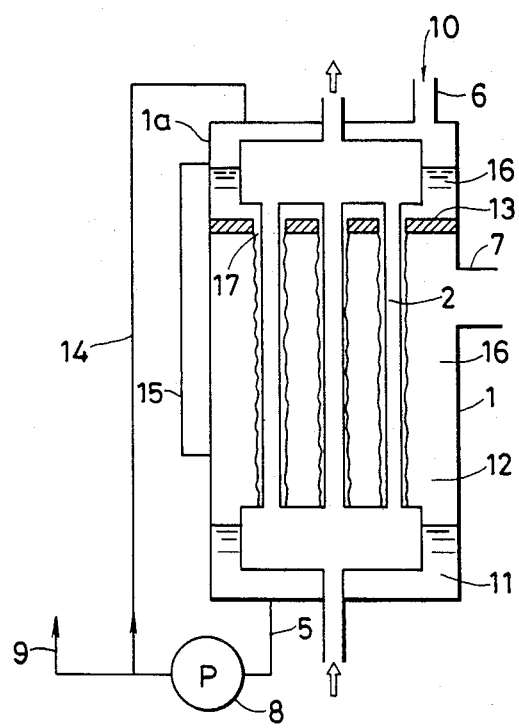
FIG. 3 is an explanatory diagram showing the arrangement of a first example of a mass transfer heat exchanger according to the invention.

A first example of a mass transfer heat exchanger according to the invention, as shown in FIG. 3, includes heat transmission pipes 2 mounted vertically, a partition board 13 which divides a tank 1 into the upper chamber 1a and the lower chamber 1b, a low-density solution lead-in pipe 14 for supplying a part of the low-density solution 11 obtained after mass exchange to the upper chamber 1a, and a return pipe 15 for delivering to the lower chamber 1b an intermediate-density solution 16 which is obtained by mixing a high-density solution 10 and a surplus of low-density solution 11 in the upper chamber 1a. A gap 17 is formed between the partition board 13 and each heat transmission pipe 2. In this case, the gap 17 is formed around the outer wall of each heat transmission pipe 2. In FIG. 3, arrows indicate the directions of flow of fluids.

The operation of the heat exchanger thus constructed will be described.

A high-density solution 10 is supplied through the high-density solution lead-in pipe 6 into the upper chamber 1a and is pooled on the partition board 13. A low-density solution 11 is also supplied through the low-density solution lead-in pipe 14 into the upper chamber 1a. Accordingly, the high-density solution 10 is mixed with the low-density solution 11 to form an intermediate-density solution 16 in the upper chamber 1a. The intermediate-density solution 16 thus formed passes through the gaps 17 between the partition board 13 and each heat transmission pipe 2 to flow down the outer walls of the heat transmission pipes 2. As a result, the intermediate-density solution 16 absorbs vapor 12 supplied through the vapor lead-in pipe 7 so that it is changed into a low-density solution 11 while generating heat. The heat thus generated is transmitted through the walls of the heat transmission pipes 2 to the fluid in the pipes 2. On the other hand, the solution 11 which has absorbed the vapor 12 is delivered through the low-density solution lead-out pipe 5 into the low-density solution discharge pipe 9 and the low-density solution lead-in pipe 14, for instance, in the ratio of 1:1 by the pump 8. A surplus of intermediate-density solution 16 in the upper chamber 1a is returned through the return pipe 15 to the lower chamber 1b.

In the mass transfer heat exchanger described above, a quantity of solution corresponding to the quantity of solution dropped for mass exchange, for instance, half of the quantity of solution dropped for mass exchange, is returned through the low-density solution lead-in pipe 14, and therefore the solution for mass exchange is continuously supplied and a surplus of solution in the upper chamber can be returned to the low chamber 1b through the return pipe 15. Furthermore, in the heat exchanger, because the heat transmission pipes 2 are mounted vertically, the solution can uniformly flow down the outer walls of the heat transmission pipes 2. Accordingly, when compared with the conventional mass transfer heat exchanger, the mass transfer is efficiently carried out on the heat transmission pipes 2; that is, the heat exchange of the invention provides excellent mass transfer characteristics, and it can be reduced in size. Because the intermediate-density solution 16 flows down the outer walls of the heat transmission pipes 2 mounted upright, even if the tank 1 is somewhat tilted, the inclination of the tank scarcely affects the performance of the heat exchanger. In other words, in the device of the invention, unlike the conventional device, all heat transmission pipes are wetted with the solution.

Figure 4:
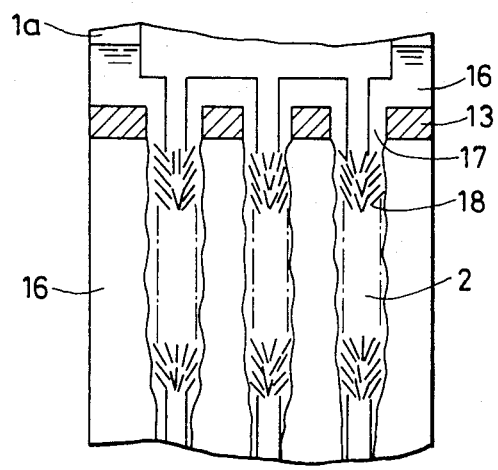
FIG. 4 is an enlarged explanatory diagram showing a modification of the heat transmission pipes in the heat exchanger according to the invention.

In the above-described embodiment, the structure of the heat transmission pipe is not limited. However, it is desirable that, as shown in FIG. 4, needle-like or tooth-like fins 18 be provided on the heat transmission pipes extending radially and upwardly. In this case, the heat transmission area is increased and the outer walls of the heat transmission pipes are uniformly wetted with the solution, as a result of which mass transmission is accelerated. Furthermore, as the fins 18 provide flow resistance, the speed of solution flow down the pipes is decreased, and therefore the mass transmission time is increased and the absorption of steam accelerated. Even if the tank is tilted, the fins can hold solution, and therefore the outer walls of the pipes are uniformly wetted with the solution; that is, the performance of the heat exchanger is maintained unchanged.

Figure 5:
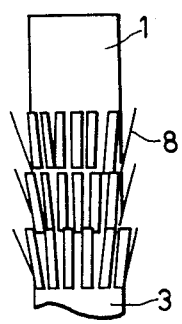
FIG. 5 and FIG. 6 are a side view and a sectional view, respectively, showing the heat transmission pipe of FIG. 4 in more detail.
Figure 6:
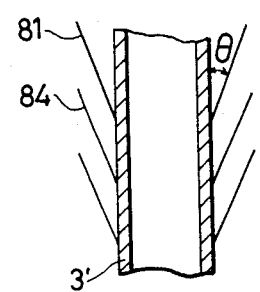
Figure 7:
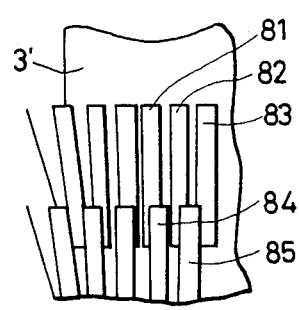
FIG. 7 is an enlarged side view of a part of the heat transmission pipe.

FIG. 5 is a side view showing a heat transmission pipe which is suitable for the mass transfer heat exchanger of the invention, FIG. 6 is a sectional view of the pipe, and FIG. 7 is an enlarged side view showing a part of the pipe in FIG. 5.

In these figures, reference numerals 81 through 85 designate fins which are in the form of teeth. The fins are bent at an angle $\theta$ with respect to the wall of the pipe as shown in FIG. 6. Gaps are provided between adjacent fins (81 and 84) and between each fin and the wall 3' of the pipe to hold solution 4' flowing down the pipe. Furthermore, the fins are arranged in such a manner that fins (81 and 84) adjacent in the direction of the axis of the pipe overlap one another when viewed in the direction perpendicular to the wall of the pipe, as shown in FIGS. 6 and 7. Preferably, the angle $\theta$ is in the range of from 5° to 50°.

Figure 8:
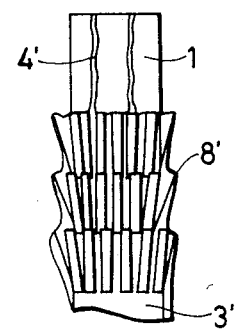
FIG. 8 is a side view showing the solution which flows down the heat transmission pipe illustrated in FIGS. 4 through 7.
Figure 9:
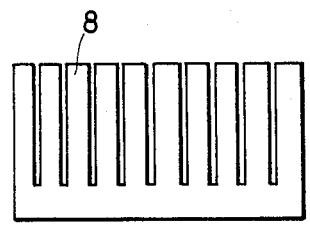
FIG. 9 is a plan view showing a series of fins and is used for a description of a method of providing the fins around the heat transmission pipe.

The dropped high-density solution flows down the heat transmission pipe while filling the gaps between the fins (81 and 84) adjacent to one another in the direction of the longitudinal axis of the pipe. In this operation, the solution spreads into the gaps between the fins (81, 82 and 83) adjacent to one another in the circumferential direction due to capillary action. Accordingly, the solution flows down the pipe while forming a solution film over the entire wall of the pipe, as shown in FIG. 8.

Because the fins provide flow resistance, in the mass transfer heat exchanger of the invention, the speed of solution flowing down the pipe is lower and the steam absorption time is longer than in the conventional mass transfer heat exchanger. Accordingly, the mass transmission characteristic of the heat transmission pipes with the fins 8' is more excellent when compared with that of a heat transmission pipe having no fins.

As described above, the solution flows down the pipe while portions thereof are retained in the gaps between the fins (81 through 85) by the capillary action. Therefore, even if the heat transmission pipes are somewhat tilted, the thickness of the solution film on the outer wall of the pipe is maintained substantially uniform, and therefore the advantageous characteristics of the mass transfer heat exchanger are maintained unchanged.

In the above-described embodiment, the fins are in the form of teeth. However, the fins may be in the form of needles. The fins are arranged regularly as shown in FIGS. 5 and 7, but they may be arranged irregularly. The fins may be provided by cutting the outer wall of the heat transmission pipe, or by winding a tape-like series of fins formed separately onto the pipe.

As is apparent from the above description, the first example of a mass transfer heat exchanger according to the invention includes the tank in which the heat transmission pipes are installed vertically, the partition board through which the heat transmission pipes are extended and which divides the tank into the upper and lower chambers, the high-density solution lead-in pipe for supplying a high-density solution to be subjected to mass exchange into the upper chamber, the pump for drawing a low-density solution obtained by mass exchange out of the lower chamber and delivering a part of the low-density solution into the upper chamber, the return pipe through which the upper chamber is communicated with the lower chamber and which is used to deliver to the lower chamber an intermediate-density solution obtained by mixing the high-density solution and a surplus of low-density solution in the upper chamber, and a vapor lead-in pipe for supplying vapor into the lower chamber so that the intermediate-density solution is allowed to flow down the heat transmission pipes passing through the gaps between the partition boards and the heat transmission pipes and to absorb the vapor while flowing down to generate heat, and the heat thus generated is transmitted to the fluid which flows through the heat transmission pipes. Accordingly, a quantity of solution corresponding to the quantity of solution flowing down is returned so that the solution flows down the heat transmission pipes continuously. Furthermore, a surplus of solution in the upper chamber can be returned to the lower chamber through the return pipe. In addition, as the heat transmission pipes are installed vertically, the solution can flow down the outer walls of the heat transmission pipes uniformly. Thus, the first example of the mass transfer heat exchanger has excellent mass transmission characteristics.

Figure 10:
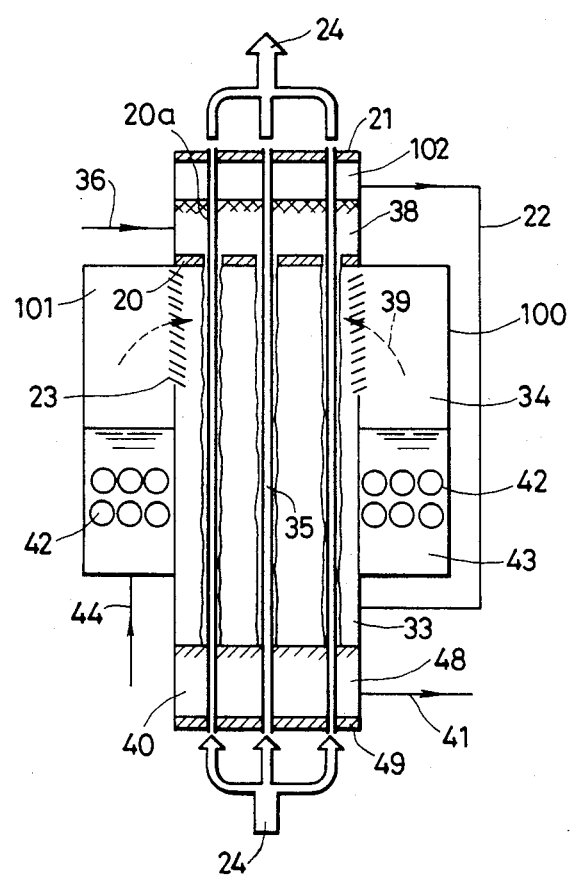
FIG. 10 is an explanatory diagram showing a second example of a mass transfer heat exchanger according to the invention.

A second example of a mass transfer heat exchanger according to the invention is shown in FIG. 10.

In FIG. 10, reference numeral 33 designates an absorbing chamber; 34, an evaporating chamber 35, heat absorbing heat transmission pipes; 36, a high-density solution lead-in pipe; 38, a high-density solution; 39, a steam; 40, a low-density solution; 41, a low-density solution lead-out pipe; 42, a heat exchanger for evaporation; 43, refrigerant; 44, a refrigerant lead-in pipe; and 48, an inner tank or cylinder.

In the inner cylinder 48, a plurality of heat transmission pipes 35 (for instance, three pipes 35) are provided extending vertically through a horizontal partition board (dispersing board) 20 which divides the inner cylinder 48 into two parts, namely, the upper chamber 102 and the absorbing chamber (or the lower chamber) 33, and the lower ends of the pipes are fixedly secured to the lower end board 49 while the upper ends are secured to the upper end board 21.

The upper chamber 102 of the inner cylinder is communicated through a return pipe (overflow pipe) 22 with the absorbing chamber 33. The inner cylinder 48 is surrounded by an annular outer cylinder (outer tank) 100. The heat exchanger 42 for evaporation, which is formed by coiling a pipe, is provided in the annular lower portion of the outer cylinder 100. An eliminator 23 is formed between the upper portion of the absorbing chamber 33 and the upper portion of the outer cylinder 100. In FIG. 10, reference numeral 24 designates fluid which flows through the heat-absorbing heat transmission pipes 35.

The operation of the device thus constructed will be described.

The high-density solution 38 is supplied through the high-density solution lead-in pipe 36 into the upper chamber 102 of the inner cylinder. The solution thus supplied flows down the outer walls of the heat transmission pipes, passing through the gaps 20a between the partition board 20 and the heat transmission pipe 35.

The flow rate of the solution is determined by the level of the high-density solution 38 in the upper chamber 102. That is, when the quantity of solution supplied into the upper chamber 102 is large, the level of the solution therein is increased, and therefore the flow rate is increased, and when the quantity of solution supplied into the upper chamber 102 is small, the level of solution therein is decreased, and therefore the flow rate is decreased. The film of high-density solution 38 formed over the outer wall of each heat transmission pipe 35 is cooled while heating the fluid which is flowing through the pipe 35. The high-density solution 38, abosrbing the refrigerant vapor 39 which flows in through the eliminator 23 from the evaporating chamber 34, generates heat. The heat thus generated is eliminated by the fluid 24 flowing through th heat transmission pipes 35. The refrigerant vapor 39 is obtained by heating the refrigerant solution 43 in the evaporating chamber 34 (which is supplied through the refrigerant lead-in pipe 44 from a condenser (not shown) with the heating medium flowing in the evaporation heat exchanger 42. The evaporation heat exchanger 42 is held in the refrigerant solution 43.

As the high-density solution 38 flows down the outer walls of the pipes 35 while absorbing the refrigerant vapor 39 its density is changed. As a result, it is converted into a low-density solution 40 which is pooled in the lower portion of the lower chamber 33. The low-density solution 40 is discharged through the low-density solution lead-out pipe 41. The eliminator 23 prevents the high-density solution 38 flowing down the outer walls of the heat-absorbing heat transmission pipes 35 from being scattered into the evaporating chamber 34. The overflow pipe 22 operates to deliver a surplus of high-density solution 38 in the upper chamber 102 into the lower chamber 33 and to maintain the pressures in these chambers equal, thus controlling the quantity of solution in the upper chamber 102.

In the mass transfer heat exchanger of the invention which operates as described above, for instance, when the temperature of the fluid flowing through the heat transmission pipes 35 is decreased, the vapor pressure of the high-density solution 38 on the pipes 35 is decreased, and therefore the vapor absorbing capability is increased, that is, the amount of refrigerant vapor 39 absorbed is increased. As a result, the level of the refrigerant solution 33 is decreased while the level of the low-density solution 40 is increased. If this phenomenon occurs, the absorption area (corresponding to the heat transmission area of the heat transmission pipes) is decreased as the level of low-density solution 40 is increased. In addition, as the level of the refrigerant solution 43 is decreased, the evaporation heat exchanger 42 appears above the surface of the refrigerant solution 43, as a result of which the evaporation area is decreased and the capability of evaporation is decreased. Accordingly, the mass transfer heat exchanger of the invention operates automatically to decrease the capability of absorption.

In contrast, when the temperature of the fluid flowing through the heat transmission pipes 35 is increased and the pressure in the mass transfer heat exchanger is increased and absorption becomes more difficult, the density of the low-density solution 40 aproaches that of the high-density solution 38 and the level of the refrigerant solution 43 in the evaporating chamber 34 is increased. In this case, the average density of the high-density solution 38 on the outer walls of the heat transmission pipes 35 is increased so that the capability of absorption is increased. On the other hand, a surplus of refrigerant solution 43 results in the rise of evaporation temperature because of the effect of the liquid column of the refrigerant solution 43 itself, thus reducing the evaporation. Therefore, in the second example of a mass transfer heat exchanger of the invention, automatic control is effected so that a surplus of refrigerant solution 43 in the evaporating chamber 34 is caused to overflow through the eliminator 23 into the inner cylinder 48, thereby preventing a decrease of evaporation and an excessive increase in the density of the low-density solution 40.

In the second example of a mass transfer heat exchanger also, it is desirable that, as shown in FIG. 4, fins 18 in the form of needles or teeth be formed on the heat transmission pipes extending radially and upwardly. As explained previously, the heat transmission area is thereby increased, and the outer walls of the heat transmission pipes are uniformly wetted with the solution because of the provision of the fins 18, as a result of which mass transmission is accelerated as in the first example. Furthermore, as the fins 18 provide flow resistance, the speed of solution flowing down the pipes is decreased, and therefore the mass transmission time is increased and the absorption of vapor is accelerated. Even if the pipes are somewhat tilted, the fins can hold solution, and therefore, the outer walls of the pipes are uniformly wetted with the solution so that the performance is maintained unchanged.

In the second example of the mass transfer heat exchanger of the invention, when external variations such as a variation of the temperature of the fluid flowing in the heat-absorbing heat transmission pipes occur, the quantity of solution, the capability of absorption, and the capability of evaporation are automatically controlled. Furthermore, as the evaporation heat exchanger is held in the solution, the mass transfer heat exchanger of the invention, unlike the conventional one, needs no refrigerant circulation pump. Thus, the second example of the mass transfer heat exchanger described above is high in reliability and economical.

What is claimed is:

1. A mass transfer heat exchanger comprising:
   a tank in which heat transmission pipes are arranged vertically;
   a partition board through which said heat transmission pipes extend, said partition board dividing said tank into the upper and lower chambers;
   a high-density solution lead-in pipe for supplying a high-density solution to be subjected to mass exchange into said upper chamber;
   a pump for drawing a low-density solution obtained by mass exchange out of said lower chamber and delivering a part of said low-density solution into said upper chamber;
   a return pipe through which said upper chamber is communicated with said lower chamber, said return pipe delivering to said lower chamber an intermediate-density solution obtained by mixing said high-density solution and a surplus of low-density solution in said upper chamber;
   a vapor lead-in pipe for supplying vapor into said lower chamber; and
   means for causing said intermediate-density solution in said upper chamber to flow down said heat transmission pipes passing through gaps between said partition boards and said heat transmission pipes and to absorb said vapor while flowing down to generate heat, and for transmitting heat thus generated to fluid flowing through said heat transmission pipes.

2. The mass transfer heat exchanger as claimed in claim 1, in which each of said heat transmission pipes comprises a plurality of fins in the form of needles or teeth arranged on an outer wall of said heat transmission pipe, extending upwardly of said heat transmission pipe and forming an angle with the axis of said pipe.

* * * * *